United States Patent Office 3,287,448
Patented Nov. 22, 1966

3,287,448
ESTERS OF 1-HYDROXYMETHYL-4-PHOSPHA-3,5,
8-TRIOXABICYCLO[2.2.2]OCTANE - 4 - SULFIDE
AND ITS ALKOXYLATED DERIVATIVES
Rudi F. W. Ratz, Hamden, Conn., assignor to Olin
Mathieson Chemical Corporation, New Haven, Conn.,
a corporation of Virginia
No Drawing. Filed Apr. 22, 1963, Ser. No. 274,798
10 Claims. (Cl. 260—937)

This invention relates to a series of phosphorus- and sulfur-containing esters, and more particularly it relates to a series of esters having the following structural formula:

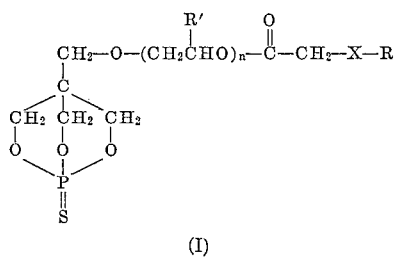

(I)

wherein $n$ is an integer from 0–10, and wherein X is selected from the group consisting of oxygen and sulfur, and wherein R is a phenyl group or a substituted phenyl group, and wherein R' is hydrogen or a methyl group.

Necessary intermediates for the preparations described herein are the primary bicyclic alcohol having the formula:

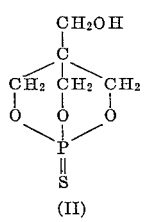

(II)

alkoxylated derivatives of this alcohol and the chloroacetate esters of the alcohol and the alkoxylated derivatives. The chemical name for the alcohol II is 1-hydroxymethyl - 4 - phospha-3,5,8-trioxabicyclo[2.2.2]octane-4-sulfide, and it is readily prepared by the reaction of pentaerythritol and thiophosphoryl chloride.

The primary object of this invention is to prepare a series of heretofore unknown phosphorus- and sulfur-containing esters. Another object of this invention is to utilize the chloroacetate esters of the aforementioned alcohols in the preparation of novel esters having the Formula I. Another object is to prepare a series of esters characterized by a high degree of biological activity. Still another object is to provide an efficient process for the preparation in high yield of esters having the Formula I. Still another object of this invention is to provide a variety of herbicidal compositions having the novel esters of this invention as the principal active ingredient.

These objects have been accomplished in accordance with the present invention. A new series of esters having the general Formula I has been prepared. It has been found that these novel esters can be prepared in high yield and excellent purity by the reaction of a variety of salts of phenols and thiophenols with the chloroacetate esters hereinbefore disclosed. The esters may be referred to as the phenoxy- and phenylmercaptoacetates of the alcohol II and its alkoxylated derivatives. These esters possess biological activity and have shown fungicidal activity. They are particularly useful as herbicides, and a number of extremely effective herbicidal formulations have been prepared containing the esters as the principal active ingredient.

The alkoxylated derivatives of the alcohol II are prepared by conventional methods familiar to those skilled in the art. For example, a series of such derivatives may be prepared by reacting the primary alcohol II with alkylene oxides in the presence of a basic catalyst. Typical alkylene oxides which may be so employed are ethylene oxide, propylene oxide, butylene oxide and the like although the first two are preferred because of their greater reactivity. The ethylene oxide adducts with the alcohol are especially preferred derivatives for use in this invention since the final esters prepared from these compounds have enhanced miscibility with water which makes them particularly useful in aqueous suspensions. It has been found that the primary alcohol II can be reacted with up to ten moles of ethylene oxide to provide derivatives suitable for conversion to the corresponding chloroacetate esters. These latter esters can be prepared in a manner similar to that shown in Example 2 of this specification.

The salts of a wide variety of phenols, thiophenols and substituted derivatives thereof may be reacted with the previously mentioned chloroacetate esters to give the novel esters of this invention. However, the preferred reactants will give final ester products having the following general formula:

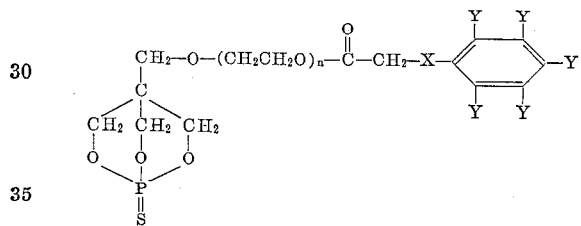

wherein $n$ and X are as previously represented, and wherein Y is selected from the class consisting of a hydrogen atom, a lower alkyl group, i.e. methyl, ethyl and the like, a halogen atom, a nitro group, a cyano group and an amino group.

The alkali metal salts of the various phenols are the preferred salts used herein. For example, the alkali metal salts of the following halogenated phenols can be used in the practice of this invention: o-fluorophenol, m-fluorophenol, p-fluorophenol, o-chlorophenol, m-chlorophenol, p-chlorophenol, o-bromophenol, m-bromophenol, p-bromophenol, o-iodophenol, m - iodophenol, p - iodophenol, 2,3-dichlorophenol, 2,4-dichlorophenol, 2,5-dichlorophenol, 2,6-dichlorophenol, 3,4-dichlorophenol, 3,5-dichlorophenol, 2,3,4-trichlorophenol, 2,3,5-trichlorophenol, 2,3,6-trichlorophenol, 2,4,5-trichlorophenol, 2,4,6-trichlorophenol, 3,4,5-trichlorophenol, 2,3,4,5-tetrachlorophenol, 2,3,4,6-tetrachlorophenol, 2,3,5,6-tetrachlorophenol and 2,3,4,5,6-pentachlorophenol.

Similarly, the alkali metal salts of 2,3-dibromophenol, 2,4-dibromophenol, 2,5-dibromophenol, 2,6 - dibromophenol, 3,4-dibromophenol, 3,5-dibromophenol, 2,3,4-tribromophenol, 2,3,5-tribromophenol, 2,4,5-tribromophenol, 2,4,6-tribromophenol, 2,3,4,5-tetrabromophenol, 2,3,4,6-tetrabromophenol, 2,3,4,5,6 - pentabromophenol, 2,4 - diiodophenol, 2,5-diiodophenol, 2,6-diiodophenol, 3,4-diiodophenol, 3,5-diiodophenol, 2,3,5-triiodophenol, 2,4,6-triiodophenal, 2,6-dichloro-4 - nitrophenol, 2 - chloro - 4 - nitrophenol, 4-chloro-2-nitrophenol, 2-chloro-4-fluorophenol, 2,4-dichloro-5-fluorophenol, 2,6-dichloro-4-fluorophenol, 2-bromo-4-fluorophenol, 2,3,4,6-tetrachloro-5-fluorophenol, 2,3,6-trichloro-3,5-difluorophenol, and 2,6 - dichloro-3,4,5-trifluorophenol are also particularly suitable for use in the preparation of novel esters in accordance with this invention.

The alkali metal salts of a number of nitrophenols can also be used to prepare heretofore unknown esters. Some of these nitrophenols include: o-nitrophenol, m-nitrophenol, p-nitrophenol, 2,4,-dinitrophenol, 2,6-dinitrophenol, 2,3-dinitrophenol, 3,4-dinitrophenol, 2,5-dinitrophenol, 2,4,6-trinitrophenol, 2,3,6-trinitrophenol, 2,3,4,6-tetranitrophenol, pentanitrophenol, 3-nitro-p-cresol, 4-hydroxy-2-nitrotoluene, 2-hydroxy-3-nitrotoluene, 2-hydroxy-5-nitrotoluene, 2-hydroxy-4-nitrotoluene, 2-hydroxy-3,5-dinitrotoluene, 3-hydroxy-2-nitrotoluene, 3-hydroxy-4-nitrotoluene, 3-hydroxy-6-nitrotoluene and 3-hydroxy-2,4,6-trinitrotoluene.

Likewise, the alkali metal salts of m-hydroxybenzenesulfonyl chloride and p-hydroxybenzonitrile are especially useful as intermediates to prepare esters in accordance with this invention.

Also, the alkali metal salts of numerous thiophenols can be readily reacted with an intermediate chloroacetate ester to give compounds of the general Formula I wherein X is a sulfur atom. Some of these thiophenols include: 3-methoxythiophenol, o-thiocresol, m-thiocresol, p-thiocresol, 2-chlorothiophenol, 3-chlorothiophenol, 4-chlorothiophenol, 2,5-dichlorothiophenol, 2-nitrothiophenol, 4-nitrothiophenol, 2,4-dinitrothiophenol, 2-aminothiophenol and 4-aminothiophenol.

The reaction of the chloroacetate intermediates with the aforementioned alkali metal salts is preferably performed in the presence of a solvent. Suitable solvents include acetonitrile, dimethylformamide, acetone and the like. The esters can be prepared in accordance with the process of this invention at reaction temperatures of from about 0° to about 160° C. However, in general a reaction temperature range of about 25° C. to 100° C. is preferably utilized in the process.

Equimolar quantities of the chloroacetate intermediate and the alkali metal salts of the various phenols should be preferably employed in the process. The alkali metal chlorides formed in the course of the preparations can be separated and removed from the reaction mixtures by conventional methods such as by filtration or water washing. The novel esters can be purified by recrystallization from appropriate solvents if desired.

The following examples will serve to illustrate the preparation of several esters of this invention. Example 1 illustrates the preparation of the bicyclic alcohol II while Example 2 is concerned with the preparation of the corresponding chloroacetate ester. The remaining examples relate to the preparation of several of the esters included in the general Formula I. These examples are illustrative only, and they are not to be construed as limiting the scope of this invention.

EXAMPLE 1

Into a 500 ml. round bottom flask was placed 99.0 g. (0.73 mole) of pentaerythritol and 123.5 g. (0.73 mole) of thiophosphoryl chloride. The flask was equipped with a reflux condenser which was connected to a drying tube filled with calcium chloride. The reaction mixture was heated by means of an oil bath to 160° C. and kept at this temperature for five hours. At this point no further hydrogen chloride was being evolved, and heating was terminated after one additional hour at 170° C. The mixture was allowed to cool to room temperature, and the slightly tan reaction product formed a cake which was first broken into lumps and then crushed into small pieces. The material was freed from some adhering sticky by-product after one washing with 150 ml. of cold ether. There was then obtained 143 g. of a free-flowing powder. This crude material was extracted with 750 ml. of boiling water from which the product crystallized in colorless small needles, M.P. 156°–158° C. During this extraction, some material remained undissolved and collected as a heavy oil at the bottom of the flask. The aqueous solution was separated from this oil by decantation through a folded filter. After one recrystallization from xylene, the purified product was isolated as shining long needles having a melting point of 160.5° C. The following analysis indicated that 1-hydroxymethyl-4-phospha-3,5,8-trioxabicyclo[2.2.2]octane-4-sulfide had been obtained in high purity. Yield: 89.5 g. (63%).

*Analysis.*—Calcd. for $C_5H_9O_4PS$: C, 30.59; H, 4.62; P, 15.82; S, 16.35. Found: C, 30.70; H, 5.10; P, 15.70; S, 16.32.

EXAMPLE 2

Into a 250 ml. round bottom flask was placed 78.4 g. (0.4 mole) of 1-hydroxymethyl-4-phospha-3,5,8-trioxabicyclo[2.2.2]octane-4-sulfide and 86 g. (0.76 mole) of chloroacetyl chloride. The flask was connected to a conventional reflux condenser bearing at its outlet a calcium chloride filled drying tube, and the contents heated by means of an oil bath at 90° C. At this temperature, the now homogeneous liquid mixture commenced to evolve hydrogen chloride. The oil bath temperature slowly was raised to 130° C. and kept there for the period of four hours. The reaction mixture was allowed to cool to room temperature and stored overnight in a refrigerator. The semi-crystalline product was placed on a Büchner funnel, and a brown oil having a repugnant odor was removed from the product by suction filtration. Final storage of the solid product on a clay plate gave 95.0 g. of ester (87% yield) in the form of gray crystals. A further small amount of an oily by-product was removed by washing the product in a beaker with 200 ml. of methanol, in which solvent the desired ester is almost insoluble. After filtration, there was obtained 82.0 g. of product which was much lighter in color and also nearly odor-free. This material was recrystallized from 400 ml. of o-dichlorobenzene, and 67.0 g. of colorless, odorless crystals having a melting point of 142° C. was obtained. A second crop of 11 g. was recovered by storage of the mother-liquor in a refrigerator for several days. The following analytical data revealed that the desired 1-chloroacetyloxymethyl-4-phospha-3,5,8-trioxabicyclo[2.2.2]octane-4-sulfide had been obtained.

*Analysis.*—Calcd. for $C_7H_{10}ClO_5PS$: C, 30.84; H, 3.70; Cl, 13.00; P, 11.36. Found: C, 30.38; H, 3.61; Cl, 13.6; P, 11.69.

EXAMPLE 3

The amount of 5.45 g. (0.02 mole) of the chloroacetate prepared in Example 2 was dissolved in 20 ml. of acetonitrile, and the clear solution was placed in a 250 ml. round bottom flask equipped with stirrer. Then a solution of 4.0 g. (3.7 g.=0.02 mole) of sodium 2,4-dichlorophenoxide in 25 ml. of acetonitrile was prepared and added to the reaction flask with stirring at room temperature. The resulting mixture was allowed to stand at ambient temperature for 48 hours. Upon filtration, there was obtained 4.6 g. of solid product. This was washed with two 15 ml. portions of water, and sodium chloride was removed leaving 3.4 g. of a water insoluble material which is the desired 2,4-dichlorophenoxyacetic ester.

The acetonitrile solution was evaporated to dryness leaving a yellow slightly tacky residue which was treated with a few mls. of acetonitrile to give 4.5 g. of a tack-free product. Thus a total of 7.90 g. of the desired ester had been obtained. Recrystallization of this material from o-dichlorobenzene gave colorless needles having a melting point of 187°–187.5° C. The following analytical data revealed that 1-[(2,4-dichlorophenoxy) acetyloxymethyl] 4-phospha-3,5,8-trioxabicyclo[2.2.2]octane-4-sulfide had been obtained. Yield: 98.9%.

*Analysis.*—Calcd. for $C_{13}H_{13}Cl_2O_6PS$: C, 39.11; H, 3.28; Cl, 17.76; P, 7.76; S, 8.03. Found: C, 38.91; H, 3.20; Cl, 18.2; P, 7.61; S, 7.85.

EXAMPLE 4

A solution of 5.767 g. (0.02 mole) of sodium pentachlorophenoxide and 5.45 g. (0.02 mole) of the chloroacetate prepared in Example 2 in 35 ml. of anhydrous dimethylformamide was prepared at room temperature, placed in a 250 ml. round bottom flask equipped with stirrer and condenser, and slowly heated to reflux. When the flask temperature reached 100° C. sodium chloride separation began to occur. The reaction mixture was stirred for 5 minutes at reflux temperature and it was then allowed to stand at ambient temperature overnight. The mixture was filtered, and sodium chloride in the amount of 1.099 g. was obtained which compares with the theoretical amount of 1.17 g. which would be expected assuming complete reaction. The solvent was removed from the clear filtrate by vacuum distillation, and there remained 10.0 g. of a light tan crystalline residue. This material was recrystallized from acetonitrile to give practically colorless crystals having a melting point of 228° C. The following analytical data revealed that 1-[(pentachlorophenoxy)acetyloxymethyl]4 - phospha-3,5,8-trioxabicyclo[2.2.2]octane-4-sulfide had been obtained. Yield: 99.5%.

*Analysis.*—Calcd. for $C_{13}H_{10}Cl_5O_6PS$: C, 31.07; H, 2.01; Cl, 35.28; P, 6.16. Found: C, 31.15; H, 2.21; Cl, 34.91; P, 6.28.

EXAMPLE 5

Into a 50 ml. round bottom flask was placed a solution of 1.16 g. (0.01 mole) of dry sodium phenoxide in 10 ml. of dimethylformamide. Another solution of 2.725 g. (0.01 mole) of the chloroacetate synthesized according to Example 2 in 5 ml. of dimethylformamide was prepared and added to the flask in one portion. The mixture was stirred under reflux for 10 minutes, and a solid precipitated from solution immediately. The mixture was allowed to stand at room temperature overnight, and then the theoretical amount of sodium chloride was removed by filtration. The solvent in the filtrate was distilled under reduced pressure leaving 3.1 g. of a slightly sticky crystalline product. This material was recrystallized from o-dichlorobenzene to yield colorless crystals having a melting point of 198° C. A second recrystallization from o-dichlorobenzene raised the melting point of 202° C. Recrystallization of the crude material from small amounts of acetone gives crystals melting at 202° C., but the use of this solvent involves a considerable material loss. The following analytical data revealed that 1 - [phenoxyacetyloxymethyl]4 - phospha - 3,5,8 - trioxabicyclo[2.2.2]octane-4-sulfide had been obtained. Yield: 94%.

*Analysis.*—Calcd. for $C_{13}H_{15}O_6PS$: C, 47.27; H, 4.58; P, 9.38. Found: C, 47.80; H, 4.85; P, 9.54.

EXAMPLE 6

Into a 250 ml. round bottom flask equipped with stirrer was placed 8.175 g. (0.03 mole) of the chloroacetate of Example 2 dissolved in 40 ml. of acetonitrile. A second solution of 4.02 g. (0.03 mole) of sodium 4-fluorophenoxide in 30 ml. of acetonitrile was prepared, and added to the reaction flask at a rapid rate at room temperature. The separation of a solid from the solution occurred immediately. The reaction mixture was allowed to stand at ambient temperature for 48 hours, and it was then filtered and 2.1 g. of dry solid was isolated. This solid contained 1.70 g. of sodium chloride and 0.40 g. of water insoluble material.

The acetonitrile was then removed from the filtrate under reduced pressure leaving a semi-solid residue. This residue was triturated with ethanol to give colorless crystals. Removal of the ethanol from the filtrate gave another crop of identical product. These two crops were combined and amounted to 7.0 g. Recrystallization from o-dichlorobenzene gave colorless small crystals having a melting point of 146°–48° C. The following analytical data revealed that 1-[(4-fluorophenoxy)acetyloxymethyl] 4 - phospha - 3,5,8 - trioxabicyclo[2.2.2]octane - 4 - sulfide had been obtained. Yield: 67%.

*Analysis.*—Calcd. for $C_{13}H_{14}FO_6PS$: C, 44.83; H, 4.05; P. 8.89. Found: C, 43.72; H, 3.70; P, 9.07.

EXAMPLE 7

Into a 250 ml. round bottom flask equipped with stirrer was placed a solution of 2.47 g. (0.0151 mole) of sodium 4-fluoro-2-chlorophenoxide in 30 ml. of warm acetonitrile. Another solution of 4.0 g. (0.0147 mole) of the chloroacetate of Example 2 in 20 ml. of acetonitrile was prepared and added rapidly to the reaction flask at room temperature. A solid immediately precipitated from solution. The reaction mixture was allowed to stand at room temperature for 48 hours. After filtration, there was obtained 1.1 g. of a solid material which contained about 0.9 g. of sodium chloride.

The acetonitrile was removed from the filtrate by distillation leaving an oily residue which formed a semicrystalline product after standing for two hours. This material was triturated with 20 ml. of cold ethanol, and there remained 2.3 g. of colorless crystals having a melting point of 151°–54° C. The clear ethanol filtrate was evaporated to dryness leaving 2.7 g. of a tack-free solid product also melting at 151°–54° C. The total crude material (5.0 g.) was recrystallized from o-dichlorobenzene to yield colorless prismatic crystals melting at 159.5°–160° C. The following analytical data revealed that 1-[(4-fluoro - 2 - chlorophenoxy)acetyloxymethyl]4 - phospha-3,5,8 - trioxabicyclo[2.2.2]octane - 4 - sulfide had been obtained. Yield: 92%.

*Analysis.*—Calcd. for $C_{13}H_{13}ClFO_6PS$: C. 40.80; H, 3.42; Cl, 9.26; P, 8.09. Found: C, 40.40; H, 3.44; Cl, 10.1; P, 7.90.

EXAMPLE 8

Into a 50 ml. round bottom flask equipped with stirrer was placed a solution of 2.58 g. (0.0118 mole) of sodium 2,4,5-trichlorophenoxide in 5 ml. of dry acetone. A second solution of 3.2 g. (0.0118 mole) of the chloroacetate of Example 2 in 8 ml. of acetone was added to the reaction flask at room temperature. The mixture was allowed to stand overnight, and it was then filtered to yield 0.9 g. of solid which contained 0.68 g. of sodium chloride.

The acetone was removed from the filtrate by evaporation leaving 4.8 g. of a solid product which was not however entirely the desired trichlorophenoxyacetic acid ester. This material was triturated with a small amount of cold acetone, and a crystalline powder remained which was collected by filtration. This material was purified by dissolving it in just enough acetone to effect complete solution. Petroleum ether was added to the solution until turbidity occurred. Upon standing, prismatic crystals separated from the mixture, and these prismatic crystals seped at 204.5°–205.5° C. The following analytical data revealed that 1 - [(2,4,5 - trichlorophenoxy)acetyloxymethyl]4 - phospha - 3,5,8 - trioxabicyclo[2.2.2]octane-4-sulfide had been obtained. Yield: 12%.

*Analysis.*—Calcd. for $C_{13}H_{12}Cl_3O_6PS$: C, 36.01; H, 2.79; Cl, 24.53; P, 7.14. Found: C, 37.68; H, 2.90; Cl, 24.20; P, 7.30.

As shown in the preceding examples, phosphorus- and sulfur-containing esters having the general Formula I can be prepared in high yield and excellent purity in accordance with this invention.

These esters are characterized by a high degree of biological activity. While they have some fungicidal properties, they have been found to be particularly effective herbicides for destroying undesirable plant growth. They are especially useful in destroying weeds which grow in the vicinity of valuable crop plants. They can be used in pre-emergence treatment, meaning that they can be applied to the area to be protected before a crop grows in this area. Thus, the esters can be used to destroy weeds growing in crops of wheat, carrots, corn, soybeans, green beans, etc. They are particularly effective in destroying ryegrass, crabgrass, mustard, pigweed, ragweed and cocklebur, although other harmful plant growth may also be successfully controlled using the esters disclosed herein.

Although the esters can be used in undiluted form as herbicides, it is more practical and economical to utilize them in a dispersed form admixed with a major amount of a suitable wet carrier or extending agent. In fact, one of the most desirable features associated with the use of these esters as herbicides is that they are effective even when used in very dilute concentrations. Thus, a variety of heribicidal formulations can be prepared having the esters of this invention as the principal active ingredient.

The term "dispersed" as used herein used in a broad sense. When it is said that the esters having the Formula I are dispersed, it means that the particles may be molecular in size and held in true solution in a suitable solvent. It means further that the particles may be colloidal in size and dispersed through a liquid phase in the form of suspension or emulsions or in the form of particles held in suspension by wetting agents. The compounds may also be dispersed and admixed in solid carriers so as to form powders, dusts or granular preparations.

The term "extending agent" as used in this specification and claims includes any and all of those carriers or diluents in which the esters of this compound are dispersed. For example, it includes the solvents of a true solution, the liquid phase of suspensions and emulsions and the solid carriers of a powder or dust.

It has been found that useful herbicidal formulations can be prepared using the esters of this invention suspended in a major amount of water as a carrier. For example, finely dispersed aqueous suspensions containing only 1.0% of the esters disclosed herein have been found to be extremely effective herbicidal compositions. These suspensions were prepared by ball milling the esters with glass beads in the presence of a small amount of water and a suspending agent and then diluting with water to the desired concentration of active ingredient. These suspensions were tested in accordance with the procedure described in "Techniques and Equipment Used in Evaluating Chemicals for Their Herbicidal Properties" by W. C. Shaw and C. R. Swanson in "Weeds," volume 1, pages 352–365, 1952, wherein various weed seeds were planted in soil in galvanized containers known as metal flats, and the soil surface was sprayed with the finely dispersed suspensions.

The following table gives test results obtained from testing several of the novel esters of this invention as preemergence herbicides against several varieties of undesirable weeds. The numbers presented therein represent the percent of repression of particular herb growth compared to untreated controls. Similar tests have shown that aqueous dispersions having from about 0.5% to about 20% ester active ingredient are also effective herbicidal compositions. For some varieties of weeds, as little as 0.5 lb. per acre of active ingredient is sufficient to destroy them.

Likewise, the esters may be advantageously formulated as emulsions. For example, they may be dissolved in an appropriate solvent such as an organic ester, i.e. ethyl and butyl acetates and the like, and the solution emulsified with water in the presence of a suitable emulsifying agent. Such formulations are especially useful for spraying techniques.

Other preferred herbicidal compositions can be formulated by admixing the esters disclosed herein with a major amount of an inert solid extending agent. A number of free-flowing powders are particularly useful as such extending agents. For example, a number of natural clays may be so utilized such as attapulgite and kaolinite clays. Also diatomaceous earth and a variety of synthetic mineral fillers derived from silica and silicate may be used. The latter fillers include such compounds as synthetic calcium or magnesium silicates. These solid formulations may also contain a wetting agent which renders them especially suitable for admixing with an additional carrier such as water if so desired. If wetting agents are thus used in these formulations, they should be present in an amount of from about 1–10% and preferably about 3% of the total solid content.

It is noted that many of the aforementioned formulations can advantageously contain a surface active agent in combination with the mixture of active ingredient and extending agent. These agents serve as suspending and emulsifying agents and as a wetting agent for solid formulations. A wide variety of such agents may be used in these herbicidual formulations if desired. Non-ionic surface active agents such as polyethoxylated alkylphenols, polyethoxylated long-chain aliphatic alcohols, polyoxyethylene sorbitol and the like are suitable surface active agents. Similarly, anionic and cationic surface active agents such as the dialkyl esters of sodium sulfosuccinate and long-chain quaternary ammonium chloride can be used in these formulations. Generally speaking in the preparation of emulsions, suspensions, etc., these agents should be used in amounts of less than 10% of the formulation, and preferable usually in amounts of about 1–3% by weight.

What is claimed is:

1. Organic phosphorus compounds having the formula

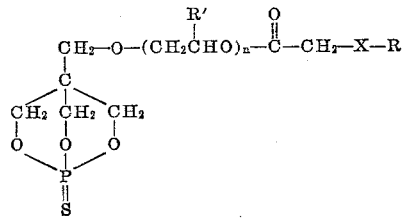

wherein $n$ is an integer from 0–10, and wherein X is selected from the class consisting of oxygen and sulfur, and wherein R is selected from the class consisting of phenyl, phenyl having a lower alkyl substituent, halogenated phenyl, nitrated phenyl, cyanophenyl, aminophenyl and chlorosulfonylphenyl, and wherein R' is selected from the class consisting of hydrogen and a methyl group.

Table 1

| Compound Tested | Lbs. Used Per Acre | Ryegrass | Crabgrass | Mustard | Pigweed |
| --- | --- | --- | --- | --- | --- |
| Ester Prepared in Example 3 | 1 | 70 | 100 | 100 | 100 |
| Do | 2 | 40 | 100 | 100 | 100 |
| Do | 5 | 70 | 100 | 100 | 100 |
| Do | 10 | 50 | 100 | 100 | 100 |
| Ester Prepared in Example 6 | 1 | 50 | 100 | 70 | 100 |
| Do | 2 | 60 | 100 | 80 | 100 |
| Do | 5 | 80 | 100 | 100 | 100 |
| Do | 10 | 90 | 100 | 100 | 100 |
| Ester Prepared in Example 7 | 1 | 60 | 100 | 100 | 100 |
| Do | 2 | 70 | 100 | 100 | 100 |
| Do | 5 | 80 | 100 | 100 | 100 |
| Do | 10 | 90 | 100 | 100 | 100 |

2. The organic phosphorus compounds of claim 1 wherein $n$ represents the integer zero.

3. The organic phosphorus compounds of claim 1 wherein R is a halogenated phenyl group.

4. The organic phosphorus compounds of claim 1 wherein R is a nitrated phenyl group.

5. 1-[(2,4 - dichlorophenoxy)acetyloxymethyl]4-phospha-3,5,8-trioxabicyclo[2.2.2]octane-4-sulfide.

6. 1-[(pentachlorophenoxy)acetyloxymethyl]4 - phospha-3,5,8-trioxabicyclo[2.2.2]octane-4-sulfide.

7. 1-[(4 - fluorophenoxy)acetyloxymethyl]4 - phospha-3,5,8-trioxabicyclo[2.2.2]octane-4-sulfide.

8. 1-[(4-fluoro - 2 - chlorophenoxy)acetyloxymethyl]4-phospha-3,5,8-trioxabicyclo[2.2.2]octane-4-sulfide.

9. 1 - [(2,4,5 - trichlorophenoxy)acetyloxymethyl]4-phospha-3,5-8-trioxabicyclo[2.2.2]octane-4-sulfide.

10. 1-[phenoxyacetyloxymethyl]-4-phospha - 3,5,8 - trioxabicyclo[2.2.2]octane-4-sulfide.

References Cited by the Examiner
UNITED STATES PATENTS

| | | | |
|---|---|---|---|
| 2,637,644 | 5/1953 | Tischler et al. | 71—2.5 |
| 3,004,980 | 10/1961 | Schrader | 260—968 X |
| 3,033,887 | 5/1962 | Wadsworth et al. | 260—461 |
| 3,038,001 | 6/1962 | Wadsworth et al. | 260—461 |
| 3,044,865 | 7/1962 | Rosen | 71—2.5 |

FOREIGN PATENTS 935,547  11/1955  Germany.

CHARLES B. PARKER, *Primary Examiner.*

FRANK M. SIKORA, *Examiner.*

JAMES O. THOMAS, R. L. RAYMOND,
*Assistant Examiners.*